US009834310B2

(12) United States Patent
Meis et al.

(10) Patent No.: US 9,834,310 B2
(45) Date of Patent: Dec. 5, 2017

(54) AUTOMATIC ACTIVATION OF A FOG PROTECTION SYSTEM ONBOARD A VEHICLE

(71) Applicant: The Boeing Company, Huntington Beach, CA (US)

(72) Inventors: Charles S. Meis, Renton, WA (US); Todd J. Germeroth, Everett, WA (US)

(73) Assignee: The Boeing Company, Chicago, IL (US)

( * ) Notice: Subject to any disclaimer, the term of this patent is extended or adjusted under 35 U.S.C. 154(b) by 70 days.

(21) Appl. No.: 14/573,614

(22) Filed: Dec. 17, 2014

(65) Prior Publication Data

US 2016/0176528 A1 Jun. 23, 2016

(51) Int. Cl.
*B64D 13/00* (2006.01)
*B60H 1/00* (2006.01)

(52) U.S. Cl.
CPC ......... *B64D 13/00* (2013.01); *B60H 1/00785* (2013.01); *B60H 1/00821* (2013.01)

(58) Field of Classification Search
CPC B60H 1/00785; B60H 1/00778; B60W 10/30
See application file for complete search history.

(56) References Cited

U.S. PATENT DOCUMENTS

| 4,931,767 | A | 6/1990 | Albrecht et al. |
| 5,496,989 | A | 3/1996 | Bradford et al. |
| 7,365,303 | B2 | 4/2008 | Pallaro |
| 7,969,566 | B2 | 6/2011 | Smith |
| 8,134,692 | B2 | 3/2012 | Yamaguchi |
| 8,572,993 | B2 | 11/2013 | No et al. |
| 8,701,427 | B2 | 4/2014 | Yelles |
| 2002/0056805 | A1* | 5/2002 | Bos .................. B60N 2/002 250/208.1 |

(Continued)

FOREIGN PATENT DOCUMENTS

| DE | 19722577 A1 | 12/1998 |
| EP | 2202107 A1 | 6/2010 |
| WO | 2014139141 A1 | 9/2014 |

OTHER PUBLICATIONS

European Search Report for co-pending counterpart European application Serial No. EP 15200927.0 dated May 3, 2016.

*Primary Examiner* — Redhwan K Mawari
*Assistant Examiner* — Rodney P King
(74) *Attorney, Agent, or Firm* — MH2 Technology Law Group LLP

(57) ABSTRACT

A method is provided that includes a number of operations performed in real-time during operation of a vehicle. That is, the method may include detecting fog on an interior surface of the window using one or more sensors according to a process, and automatically activating a fog protection system to reduce or prevent fog on the interior surface of the window in an instance in which fog is detected according to the process. For each sensor, the process may include receiving a measurement from the sensor. And from the measurement, the process may include identifying or calculating a dew-point temperature in a compartment of the vehicle including the window to an exterior thereof, and detecting fog on the interior surface of the window in an instance in which the dew-point temperature is near, at, or above a surface temperature of the interior surface of the window.

15 Claims, 5 Drawing Sheets

(56) References Cited

U.S. PATENT DOCUMENTS

| | | |
|---|---|---|
| 2005/0178200 A1 | 8/2005 | Stauss et al. |
| 2006/0004494 A1 | 1/2006 | Errington |
| 2008/0066477 A1 | 3/2008 | Aoki et al. |
| 2008/0173437 A1* | 7/2008 | Yelles ................... B60S 1/0896 165/204 |
| 2009/0039170 A1 | 2/2009 | Burns et al. |
| 2014/0129044 A1 | 5/2014 | Wenzel |

\* cited by examiner

AUTOMATIC ACTIVATION OF A FOG PROTECTION SYSTEM ONBOARD A VEHICLE

TECHNOLOGICAL FIELD

The present disclosure relates generally to fog detection/prediction and, in particular, to fog detection/prediction and automatic activation of a fog protection system onboard a vehicle such as an aircraft.

BACKGROUND

Throughout the history of pressurized aircraft, the accumulation of fog on cockpit windows has presented a challenge to the flight of aviators. Given that windshield or side window fog can obstruct clear flight path visibility, the real-time detection of environmental humidity conditions conducive to windshield and/or side window fog is an important cockpit input needed to ensure normal flight operations, especially during the flight phases of approach and landing.

In the aerospace industry certification regulations mandate that any aircraft window heat system must provide anti-fog capability to ensure the at least a portion of the interior surfaces of the cockpit windshield and side windows remain clear of fog to the extent that both pilots have clear visibility of a typical flight path. In order to achieve this directive, any anti-fog system that is installed must be capable of maintaining a window clear of fog at any cockpit ambient dew point temperature.

Historically, the majority of aircraft have not had an automatic real-time window fog detection/prediction system installed, but rather depended on the physical identification of windshield or side window fog by the flight crew and subsequent manual activation of fog protection systems. Alternatively, some aircraft have been equipped with electric or pneumatic anti-fog systems to prevent the formation of fog on windshield surfaces from ever occurring in the course of a given flight. But these anti-fog systems are typically operated for the entire flight and therefore impose excessive energy and fuel burn requirements since the systems are often operating when fog accumulation conditions are not present.

Therefore, it may be desirable to have a system and method that takes into account at least some of the issues discussed above, as well as possibly other issues.

BRIEF SUMMARY

Example implementations of the present disclosure are generally directed to an improved apparatus, method and computer-readable storage medium for real-time or near real-time detection or prediction of fog on one or more windows of a vehicle such as transport category commercial aircraft due to environmental humidity conditions. Example implementations may then automatically activate one or more fog protection systems to reduce or prevent the accumulation of fog. Example implementations may reduce operator workload and/or optimize energy use by activating the fog protection systems only when in or near fog conditions due to environmental humidity conditions.

According to one aspect of example implementations, the method includes a number of operations performed in real-time during operation of the vehicle. That is, the method may include detecting or predicting fog on an interior surface of the window using one or more sensors according to one or more processes. And the method may include automatically activating a fog protection system to reduce or prevent fog on the interior surface of the window in an instance in which fog is detected or predicted according to one or more of the processes, or in some examples, only in an instance in which fog is detected or predicted from the measurement from a majority of the sensor(s) used in the process(es).

For each sensor, the process may include receiving a measurement from the sensor. From the measurement, the process may include identifying or calculating a dew-point temperature in a compartment of the vehicle including the window to an exterior thereof, and detecting or predicting fog on the interior surface of the window in an instance in which the dew-point temperature is near, at, or above a surface temperature of the interior surface of the window. In some examples, the process may further include calculating the surface temperature of the interior surface of the window as a function of a total air temperature exterior to the vehicle, and a speed of the vehicle.

In some examples, the sensor may include a temperature sensor, and receiving the measurement from the sensor includes receiving a measurement of an ambient temperature in the compartment from the temperature sensor. In these examples, the process may further include receiving a measurement of a relative humidity in the compartment from a relative-humidity sensor. The dew-point temperature may then be calculated as a function of the ambient temperature and relative humidity within the compartment.

In some examples, the process may be a first process, and the sensor(s) may be or include first sensor(s). Alternatively, carrying out a first process can be characterized as receiving and/or manipulating measurements from first sensors to obtain a first result. The first result may then be used to identify and/or calculate certain data, such as dew-point temperature, and to detect or predict the presence of fog. In these examples, the method may further include detecting fog on the interior surface of the window using one or more second sensors according to a second process. Similar to the foregoing characterization of carrying out a first process, carrying out a second process can be characterized as receiving and/or manipulating measurements from second sensors to obtain a second result. The second result may then be used to identify and/or calculate certain data, such as intensity of a light beam reflected off the interior surface of the window. The second result may then be used to detect or predict the presence of fog. For each second sensor, this process may include receiving a measurement from the second sensor, with the measurement being of an intensity of a light beam reflected off the interior surface of the window; and from the measurement. The process may then include detecting fog on the interior surface of the window in an instance in which the intensity is below a predetermined threshold, which could be defined by a quantifiable obscuration level from the light beam receiver. This obscuration level could further be defined or stored by software within the system controller, such as but not limited to, 90% of the baseline (no obscuration) intensity as an indication of a fog condition.

The fog protection system may be automatically activated in an instance in which fog is detected or predicted according to the first process or second process. Or in some further examples, the fog protection system may be automatically activated only in an instance in which fog is detected or predicted from the measurement from a majority of the collective of first sensor(s) and second sensor(s).

In other aspects of example implementations, an apparatus and a computer-readable storage medium are provided for detecting or predicting inflight fog on a window of a vehicle. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

Figure 1A:
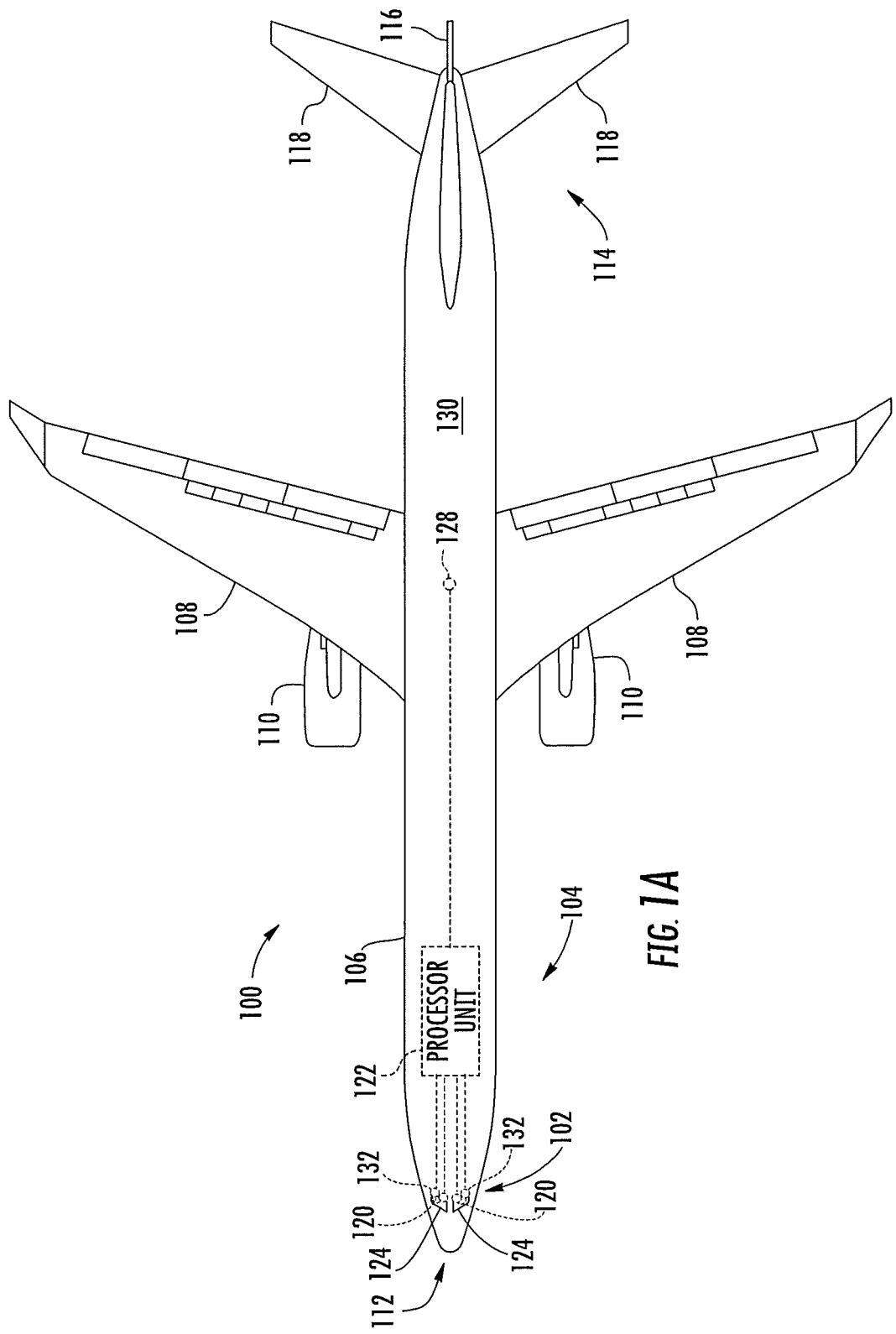
FIGS. 1A and 1B illustrate respectively an aircraft and its cockpit, the aircraft being equipped with a fog detection/prediction system in accordance with example implementations of the present disclosure.

Each figure shown in this disclosure shows a variation of an aspect of the embodiments presented, and only differences will be discussed in detail.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Also, something may be shown or described as being to a first, second, third or the like should not be taken to imply a specific order, unless otherwise stated. Further, although reference may be made herein to a number of measures, predetermined thresholds and the like such as times, distances, speeds, percentages and the like, according to which aspects of example implementations may operate; unless stated otherwise, any or all of the measures/predetermined thresholds may be configurable. Like reference numerals refer to like elements throughout.

Example implementations of the present disclosure are generally directed to real-time or near real-time detection or prediction of fog on one or more windows of a vehicle. Example implementations will be primarily described in the context of a vehicle such as transport category commercial aircraft. It should be understood, however, that example implementations may be equally applicable to any of a number of other vehicles such as general aviation aircraft (e.g., airplanes, helicopters), automobiles, trains, watercraft (e.g., boats, ships) and the like.

Figure 1B:
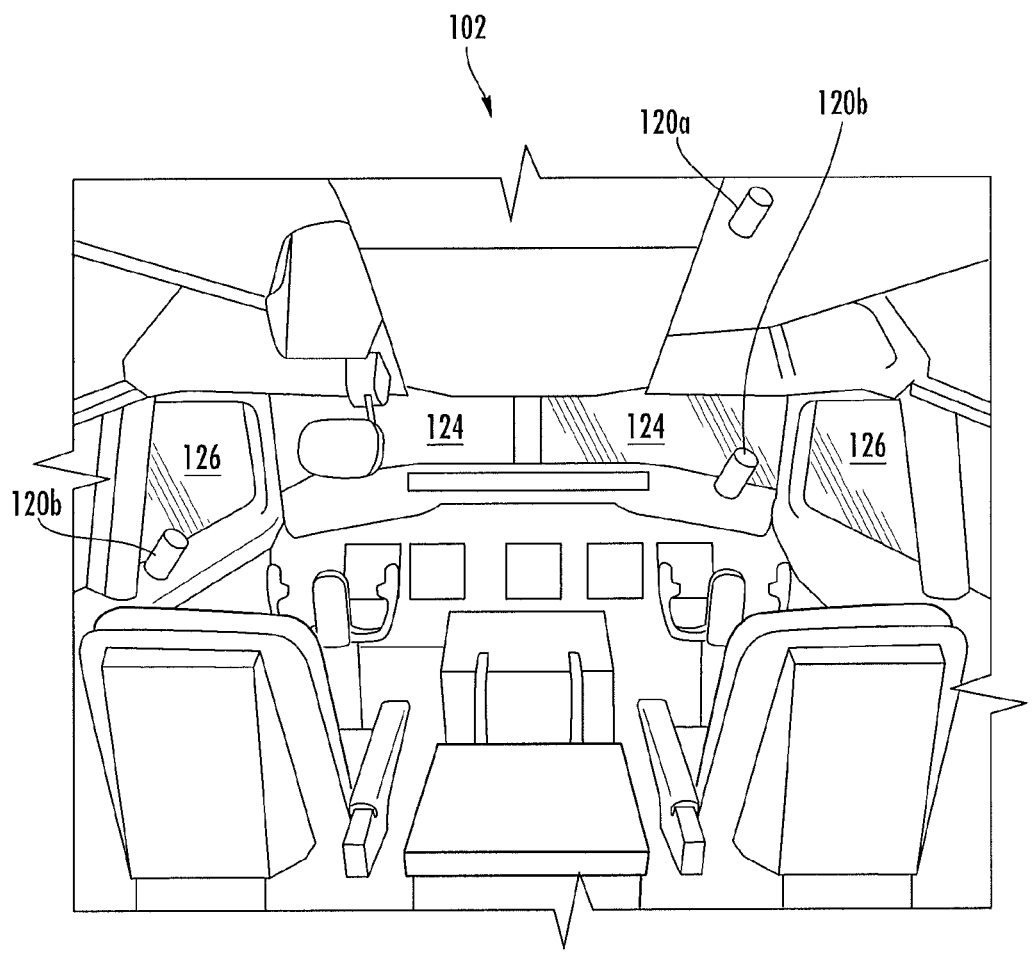

FIGS. 1A and 1B illustrate respectively an aircraft 100 and its cockpit 102 (sometimes referred to as a flight deck—and more generally a compartment), the aircraft being equipped with fog detection/prediction system 104 in accordance with example implementations of the present disclosure. As shown, the aircraft is a commercial, twin-engine aircraft. It should be understood, however, that other types of aircraft including fixed-wing aircraft and rotorcraft, commercial and military aircraft, and the like may be equally equipped with the system of example implementations.

In addition to the cockpit 102, the aircraft 100 includes a fuselage 106 to which a pair of wings 108 are attached; and the aircraft includes a pair of engines 110 attached to the wings. The fuselage has a nose section 112 at the forward part of the aircraft, and a tail section 114 at the aft part of the aircraft. A vertical stabilizer 116 and a pair of horizontal stabilizers 118 are attached to the tail section of the fuselage.

The fog detection/prediction system 104 may be generally configured to detect fog on one or more windows of the aircraft 100. The fog detection/prediction system includes one or more of each of a number of components such as one or more sensors 120 at a location proximate one or more windows of the aircraft, and coupled to a processor unit 122. These windows may include, for example, one or more windows in the cockpit 102 such as one or more windshield windows 124, side windows 126 and the like in the cockpit, although any of a number of other windows throughout the aircraft may equally benefit from example implementations. A temperature sensor 128 at a location on the surface 130 of the aircraft is also depicted in addition to sensors 120.

The sensors 120 may be any of a number of different types of sensors configured to detect, predict, or otherwise measure conditions on an interior surface of the window(s) 124, 126 or in an interior environment of the window(s) such as within the cockpit 102, which may be indicative of fog on the interior surface of the window(s). As explained in greater detail below, examples of suitable sensors include first sensors 120$a$ such as a dew-point sensor, temperature sensor, relative humidity sensor and the like, which in some examples may be located near the ceiling of the cockpit. Other examples of suitable sensors include second sensors 120$b$ such as one or more light emitter/detector pairs, which in some examples may be located adjacent to the window(s). In examples including a light emitter/detector pair, the pair may be located to ensure that the angle formed between the interior surface of the window and incident light beam emitted from the emitter is greater than the critical angle of the light beam, which may ensure total internal reflection of the emitted light beam.

In accordance with example implementations, the processor unit 122 may be configured to detect or predict fog on an interior surface of a window 124, 126 using one or more sensors 120, and perform one or more actions in response thereto, in real-time (real-time generally herein including near real-time) during flight of the aircraft 100 (or more generally operation, or transportive operation of the vehicle). For each sensor, the processor unit may receive a measurement from the sensor. From the measurement, the processor unit may identify or calculate a dew-point temperature in the cockpit 102 (compartment) of the aircraft 100 (vehicle) including the window to an exterior thereof. The processor unit may then detect or predict fog on the interior surface of the window in an instance in which the dew-point temperature is near, at, or above a surface temperature of the interior surface of the window. "Near or at" a surface temperature, for reference purposes herein, can indicate that a surface temperature above the dew-point temperature by less than 5° F. (~3° C.), such as may fulfill the following:

$$DPT+5° F. \geq ST > DPT$$

where DPT is the dew-point temperature and ST is the surface temperature.

Figure 2:
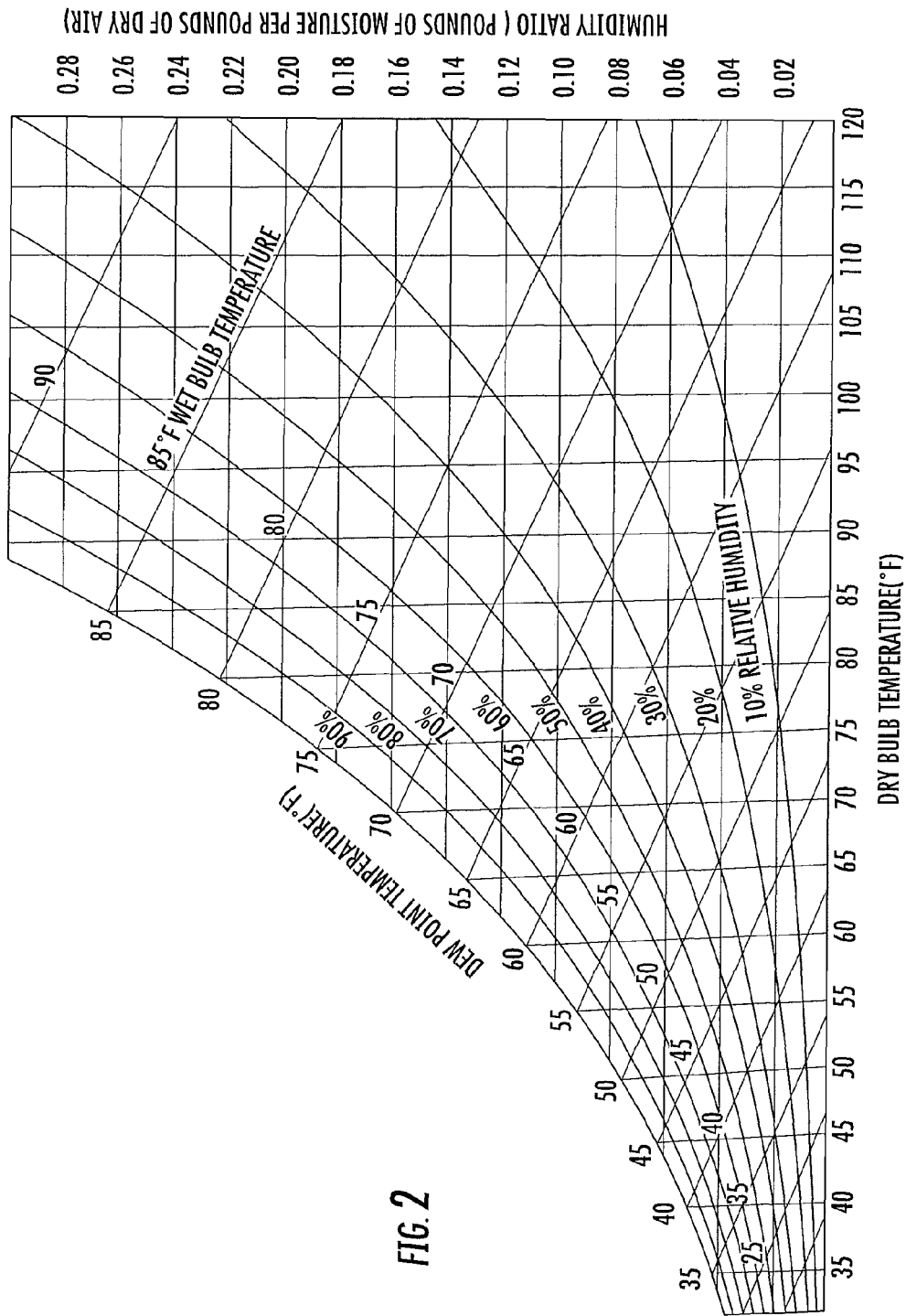
FIG. 2 illustrates a psychrometric chart according to example implementations.

In some examples, the sensor 120 may be a dew-point sensor from which the processor unit 122 may receive a measurement of the dew-point temperature in the cockpit 102. In some examples, the sensor may be a temperature sensor from which the processor unit 122 may receive a measurement of an ambient temperature in the cockpit. In these examples, the sensors may also include a relative-humidity sensor from which the processor unit may further receive a measurement of a relative humidity in the cockpit. The processor unit may then calculate the dew-point temperature as a function of the ambient temperature and relative humidity within the cockpit. In one example, the dew-point temperature may be calculated based on a known relationship between ambient temperature, relative humidity and dew-point temperature such as from a database or table of values from a psychrometric chart such as that shown in FIG. 2.

In some examples, the processor unit 122 may calculate the surface temperature of the interior surface of the window 124, 126 as a function of one or more aircraft flight parameters such as total air temperature exterior to the aircraft 100, and a speed of the aircraft. In some examples, the processor unit may monitor an aircraft data bus for one or more of these aircraft flight parameters. In another example, the total air temperature may be obtained from the temperature sensor 128.

In some examples, the aforementioned process by which the processor unit 122 detects or predicts fog may be a first process and the sensors 120 (e.g., dew-point sensor, temperature sensor, relative-humidity sensor) may include first sensors 120a. In these examples, the processor unit may further detect or predict fog on the interior surface of the window 124, 126 using one or more second sensors 120b according to a second process. For each second sensor, the processor unit may receive a measurement from the second sensor, with the measurement being of an intensity of a light beam reflected off the interior surface of the window. From the measurement, then, the processor unit may detect fog on the interior surface of the window in an instance in which the intensity is below a predetermined threshold, such as in an instance in which the intensity decreases by at least a certain percentage indicative of fog on the interior surface.

The processor unit 122 may perform one or more alert or remedial actions in an instance in which fog is detected or predicted according to the first process or second process, such as to receive a first and/or second result. For example, the processor unit may cause automatic activation of one or more fog protection systems 132 (e.g., anti-fog systems, defog systems) onboard the aircraft. These systems may be deployed proximate the windows 124, 126 and employ various different types of mechanisms to remove or prevent the formation of fog on their interior surfaces. Examples of suitable fog protection systems include an electrically-heated element embedded into or on the surface of the window, or a blower with a nozzle configured to direct pneumatic (hot air) across the surface of the window, in either instance the fog protection systems being configured to raise the interior surface temperature of the window to above the dew-point temperature, which may reduce or prevent fog on the interior surface of the window.

In some examples, the sensors 120 may be distributed over a plurality of windows 124, 126. In these examples, the processor unit 122 may detect or predict fog and cause activation of the fog protection systems 132 on a per-window basis. Or the processor unit may detect or predict fog on a per-window basis, but activate fog across multiple of the windows in an instance in which fog is detected or predicted on the interior surface of one of the windows. Additionally or alternatively, one or more of the windows may include redundant sensors so as to avoid false detections or predictions. In any instance, in some examples, the processor unit may cause automatic activation of the fog protection system only in an instance in which fog is detected or predicted from the measurement from a majority of the sensors, such as a majority of first sensors 120a, a majority of the second sensors 120b, or a majority of the collective first and second sensors.

Figure 3:
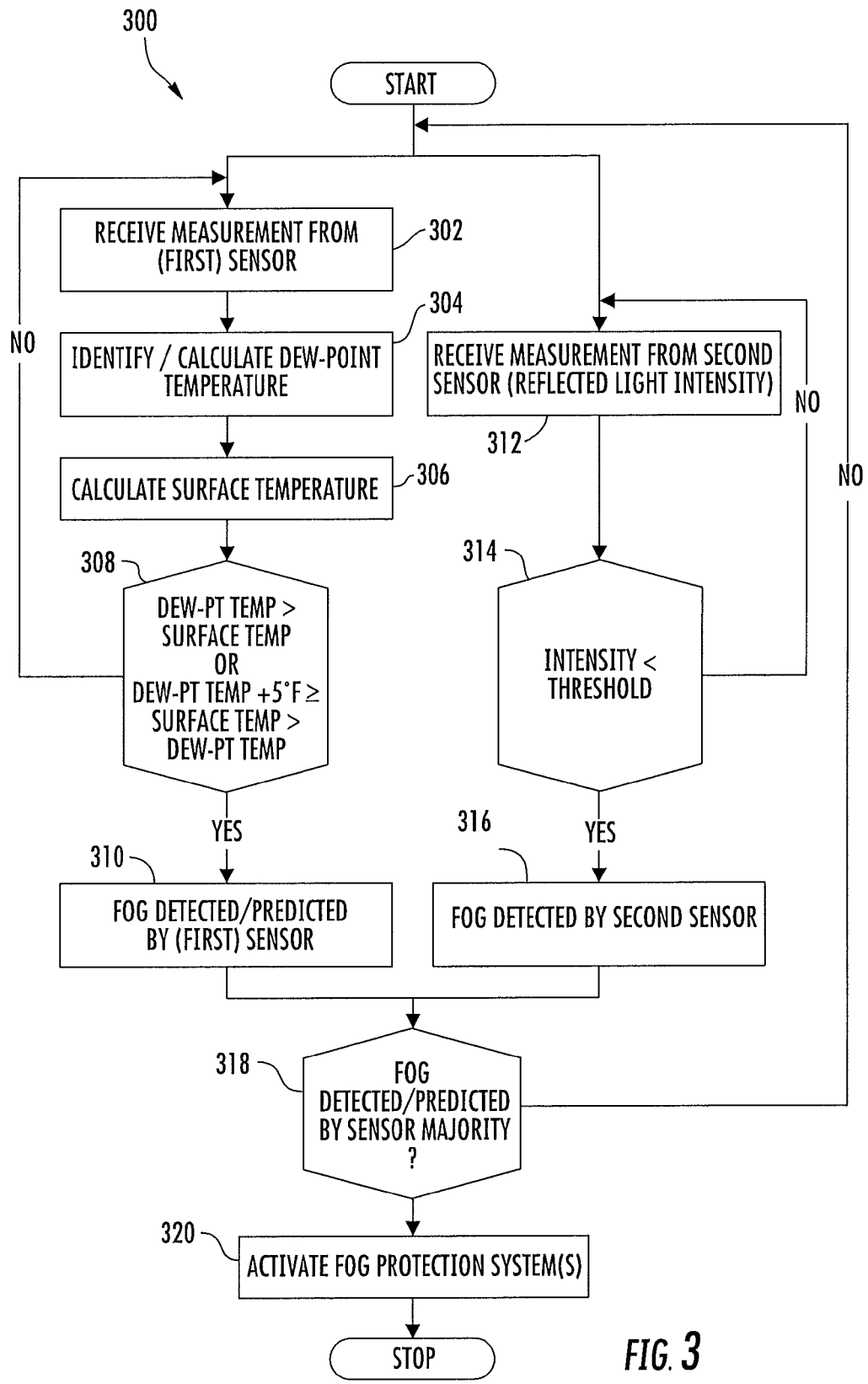
FIG. 3 illustrates a flowchart including various operations in a method according to one example implementation.

FIG. 3 illustrates a flowchart including various operations in a method 300 according to one example implementation of the present disclosure. As shown, the method may include a number of operations performed continuously in real-time during operation of a vehicle such as the aircraft 100.

The method 300 may include detecting or predicting fog on an interior surface of a window 124, 126 using one or more sensors 120 according to a process, as shown at block 310. And the method may include automatically activating a fog protection system 132 to reduce or prevent fog on the interior surface of the window in an instance in which fog is detected or predicted according to the process, or in some examples, only in an instance in which fog is detected or predicted from the measurement from a majority of the sensor(s), as shown at block 320.

For each sensor 120, the process may include receiving a measurement from the sensor, as shown at block 302. From the measurement, the process may include identifying or calculating a dew-point temperature in the cockpit 102 (compartment) of the aircraft 100 (vehicle) including the window 124, 126 to an exterior thereof, as shown in block 304. In some examples, the method may further include calculating the surface temperature of the interior surface of the window as a function of a total air temperature exterior to the aircraft, and a speed of the aircraft, as shown in block 306. In one example, the outer surface temperature ($T_{surface}$) may be calculated as a function of total temperature ($T_{total}$) and Mach number as follows:

$$T_{surface} = f[T_{total}/(1+0.2 \times \text{Mach})]$$

In the preceding, $T_{total}$ represents the total air temperature and Mach represents the Mach number relationship to speed of the aircraft. In some examples, the surface temperature may be assumed to be the same on internal and external surfaces of the window 124, 126, with the window being unheated until the time when the fog protection system 132 is activated. In the above and in other notational examples, temperatures may be represented in degrees Celsius, although the temperatures may be similarly represented and calculated in other appropriate units.

In some examples in which the sensor is a temperature sensor, and the measurement from the temperature sensor may be an ambient temperature in the cockpit 102 from the temperature sensor. In these examples, the process may further include receiving a measurement of a relative humidity in the cockpit from a relative-humidity sensor. The dew-point temperature may then be calculated as a function of the ambient temperature and relative humidity within the cockpit. More notationally, for example, the dew-point temperature ($T_{dew\text{-}point}$) may be calculated as follows:

$$T_{dew\text{-}point} = RH^{0.125} \times (112+0.9 \times T_{cockpit}) + (0.1 \times T_{cockpit}) - 112$$

In the preceding, RH represents the percentage relative humidity, and $T_{cockpit}$ represents the ambient temperature in degrees Celsius. And in some further more simplified examples, the numerical value of the dew-point temperature may be calculated as follows:

$$T_{dew\text{-}point}=(100-RH)/5 \text{ (where } T_{dew\text{-}point} \text{ is in degrees Celsius)} \quad (5)$$

The method may include detecting or predicting fog on the interior surface of the window in an instance in which the dew-point temperature (e.g., $T_{dew\text{-}point}$) is near, at, or above a surface temperature (e.g., $T_{surface}$) of the interior surface of the window, as shown in blocks 308, 310.

In some examples, the aforementioned process may be a first process, and the sensor(s) 120 may be or include first sensor(s) 120a. Alternatively, carrying out a first process can be characterized as receiving and/or manipulating measurements from first sensors to obtain a first result. The first result may then be used to identify and/or calculate certain data, such as dew-point temperature, and to detect or predict the presence of fog. In these examples, the method may further include detecting fog on the interior surface of the window using one or more second sensors 120b according to a second process, as shown at block 316. Similar to the foregoing characterization of carrying out a first process, carrying out a second process can be characterized as receiving and/or manipulating measurements from second sensors to obtain a second result. The second result may then be used to identify and/or calculate certain data, such as intensity of a light beam reflected off the interior surface of the window. The second result may then be used to detect or predict the presence of fog. For each second sensor, this process may include receiving a measurement from the second sensor, with the measurement being of an intensity of a light beam reflected off the interior surface of the window; and from the measurement, as shown at block 312. The process may then include detecting fog on the interior surface of the window in an instance in which the intensity is below a predetermined threshold, as shown at blocks 314, 316.

The fog protection system 132 may be automatically activated in an instance in which fog is detected or predicted according to the first process or second process, as shown at block 320. Or in some further examples, the fog protection system may be automatically activated only in an instance in which fog is detected or predicted from the measurement from a majority of the collective of first sensor(s) and second sensor(s), as shown at blocks 318, 320.

The fog protection system 132 may be activated to reduce or prevent fog on the interior surface of the window 124, 126, and may remain active until deactivated. In some examples, the fog protection system may be deactivated after some point in time determined to be sufficient for the fog protection system to clear the window of fog and/or to bring the surface temperature of the window up to a point in which fog is no longer predicted, which may optimize energy usage required by the fog protection system. In some examples, the fog protection system may remain active until measurements from the sensors no longer indicate fog or a prediction of fog on the interior surface of the window, as according to the first and/or second processes; or for a period of time (e.g., five minutes) after the measurements last indicate or predict fog.

Figure 4:
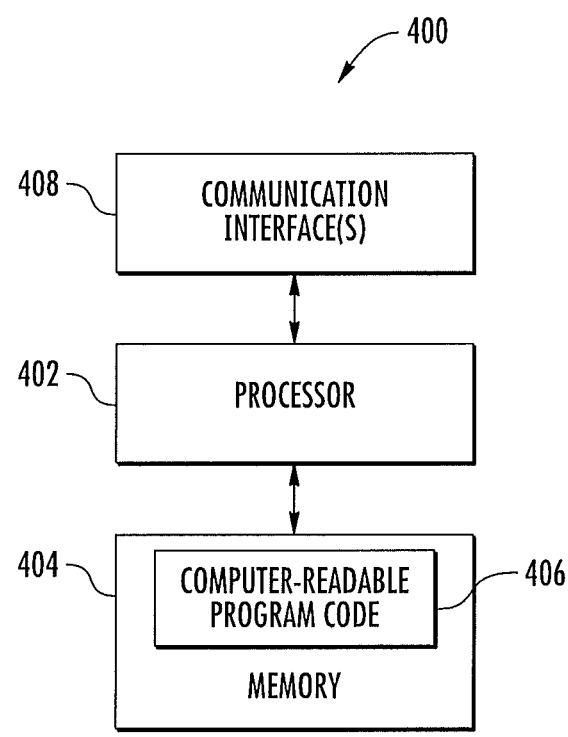
FIG. 4 illustrates an apparatus that according to some examples may be configured to at least partially implement a processor unit in accordance with example implementations.

FIG. 4 illustrates an apparatus 400 that according to some examples may be configured to at least partially implement the processor unit 122. Generally, the apparatus of exemplary implementations of the present disclosure may comprise, include or be embodied in one or more fixed, portable or embedded electronic devices. The apparatus may include one or more of each of a number of components such as, for example, a processor 402 comprising hardware and software connected to a memory 404.

The processor 402 is generally any piece of computer hardware that is capable of processing information such as, for example, data, computer-readable program code, instructions or the like (at times generally referred to as "computer programs," e.g., software, firmware, etc.), and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 404 (of the same or another apparatus).

The processor 402 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 404 is generally any piece of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disc-read only memory (CD-ROM), compact disc-read/write (CD-R/W), digital versatile disc (DVD) or other standard media and format. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory 404, the processor 402 may also be connected to one or more interfaces for displaying, transmitting and/or receiving information. The interfaces may include a communications interface 408 (e.g., communications unit). The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

As indicated above, program code instructions may be stored in memory, and executed by a processor, to implement functions of the systems, subsystems and their respective elements described herein. As will be appreciated, any suitable program code instructions may be loaded onto a computer comprising hardware and software, or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 400 may include a processor 402 and a computer-readable storage medium or memory 404 coupled to the processor, where the processor is configured to execute computer-readable program code 406 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for detecting or predicting fog on an interior surface of a window of a compartment of a vehicle, the apparatus comprising:
    a processor;
    at least one first sensor coupled to the processor;
    at least one second sensor coupled to the processor;
    a fog protection system; and
    a computer-readable storage medium coupled to the processor and having computer-readable program code stored therein that, in response to execution by the processor, causes the apparatus real-time during operation of the vehicle to:
        receive at least one measurement from the first sensor, and from the measurement identify or calculate a dew-point temperature in the compartment of the vehicle including the window;
        calculate a surface temperature of at least a portion of the interior surface of the window;
        detect or predict fog on the interior surface of the window in the event the dew-point temperature is at, near, or above the surface temperature of the interior surface of the window;
        receive at least one measurement from the at least one second sensor, the measurement being of an intensity of an emitted light beam as reflected off the interior surface of the window;
        detect fog on the interior surface of the window in the event the intensity is below a predetermined threshold; and
        automatically activate the fog protection system in the event fog is detected or predicted according to the measurement of the at least one first sensor or the measurement of the at least one second sensor, wherein the apparatus detects fog on a per-window basis and activates the fog protection system to reduce or prevent fog on the window and one or more other windows when the fog is detected on the window but not detected on the one or more other windows.

2. The apparatus of claim 1, wherein the one or more first sensors include a temperature sensor and a relative humidity sensor;
    wherein causing the apparatus to receive at least one measurement from the first sensor includes causing the apparatus to receive an ambient temperature in the compartment from the temperature sensor and to receive a relative humidity in the compartment from a relative-humidity sensor;
    wherein causing the apparatus to identify or calculate the dew-point temperature includes causing the apparatus to calculate the dew-point temperature as a function of the ambient temperature and relative humidity within the compartment; and
    wherein causing the apparatus to calculate the surface temperature includes causing the apparatus to calculate the surface temperature as a function of a total air temperature exterior to the vehicle and a speed of the vehicle.

3. The apparatus of claim 1, wherein the apparatus comprises at least two first sensors;
    wherein causing the apparatus to receive at least one measurement from the first sensor includes causing the apparatus to receive at least one measurement from each of the first sensors; and wherein causing the apparatus to automatically activate the fog protection system includes causing the apparatus to automatically activate the fog protection system only in the event fog is detected or predicted from the measurements from a majority of the one or more first sensors.

4. The apparatus of claim 1, wherein causing the apparatus to automatically activate the fog protection system includes causing the apparatus to automatically activate the fog protection system only in the event fog is detected from measurements from a majority of a collective of the one or more first sensors and the one or more second sensors.

5. The apparatus of claim 1, wherein the vehicle comprises an aircraft, and wherein the first sensor is located near a ceiling of a cockpit of the aircraft.

6. The apparatus of claim 1, wherein the dew-point temperature is calculated using the following equation $$T_{dew\text{-}point} = RH^{0.125} * (112 + 0.9 * T_{cockpit}) + (0.1 * T_{cockpit}) - 112,$$

where $T_{dew\text{-}point}$ is the dew-point temperature, RH is a percentage of relative humidity, and $T_{cockpit}$ is the temperature in the cockpit.

7. The apparatus of claim 1, wherein the dew-point temperature is calculated using the following equation $$T_{dew\text{-}point} = (100 - RH)/5$$

where $T_{dew\text{-}point}$ is the dew-point temperature and RH is a percentage of relative humidity.

8. A method of detecting or predicting fog on an interior surface of a window of a compartment of a vehicle, the method comprising:
receiving a measurement from at least one first sensor to obtain a first result;
identifying or calculating a dew-point temperature in the compartment of the vehicle including the interior surface of the window from the first result;
calculating a surface temperature of at least a portion of the interior surface of the window;
detecting or predicting fog on the interior surface of the window from the first result in the event the dew-point temperature is at, near, or above the surface temperature;
receiving a measurement from at least one second sensor to obtain a second result, the second result including an intensity of an emitted light beam as reflected off the interior surface of the window;
detecting or predicting fog on the interior surface of the window from the second result in the event the intensity is below a predetermined threshold; and
automatically activating a fog protection system according to the first result or the second result, wherein fog is detected or predicted on a per-window basis, and the fog protection system is activated to reduce or prevent fog on the window and one or more other windows when the fog is detected on the window but not detected on the one or more other windows.

9. The method of claim 8, wherein receiving a measurement from at least one first sensor includes receiving measurements from at least two sensors to obtain the first result, the sensors including a temperature sensor and a relative-humidity sensor;
wherein receiving the measurements includes receiving a measurement of an ambient temperature in the compartment from the temperature sensor and receiving a measurement of a relative humidity in the compartment from the relative-humidity sensor, the first result being a combination of the ambient temperature and the relative humidity;
wherein identifying or calculating the dew-point temperature includes calculating the dew-point temperature based on the first result as a function of the ambient temperature and relative humidity within the compartment; and
wherein calculating the surface temperature includes calculation of the surface temperature as a function of a total air temperature exterior to the vehicle and a speed of the vehicle.

10. The method of claim 8, wherein receiving a measurement from at least one sensor to obtain a first result includes receiving measurements from at least two sensors; and
wherein automatically activating the fog protection system includes automatically activating the fog protection system only in the event fog is detected or predicted from measurements from a majority of the sensors used to obtain the first result.

11. The method of claim 8, wherein automatically activating the fog protection system includes automatically activating the fog protection system only in the event fog is detected or predicted from the measurements from results obtained from a majority of a collective of the one or more first sensors and the one or more second sensors.

12. A computer-readable storage medium for detecting fog on a window of a compartment of a vehicle, the computer-readable storage medium being non-transitory and having computer-readable program code stored therein that, in response to execution by a processor, cause an apparatus to in real-time during operation of the vehicle to:
receive at least one measurement from one or more first sensors, and from the measurement identify or calculate a dew-point temperature in the compartment of the vehicle including the window;
calculate a surface temperature of at least a portion of an interior surface of the window;
detect or predict fog on the interior surface of the window in the event the dew-point temperature is at, near, or above the surface temperature of the interior surface of the window;
receive at least one measurement from one or more second sensors, at least one of the second sensors being operable to measure an intensity of an emitted light beam as reflected off the interior surface of the window;
detect fog on the interior surface of the window the event the intensity is below a predetermined threshold; and
automatically activate a fog protection system in the event fog is detected or predicted according to the measurement of the one or more first sensors or the measurement of the one or more second sensors, wherein fog is detected on a per-window basis, and the fog protection system is activated to reduce or prevent fog on the window and one or more other windows when the fog is detected on the window but not detected on the one or more other windows.

13. The computer-readable storage medium of claim 12, wherein the one or more first sensors include a temperature sensor and a relative-humidity sensor;
wherein causing the apparatus to receive at least one measurement includes causing the apparatus to receive an ambient temperature in the compartment from the temperature sensor and to receive a relative humidity in the compartment from the relative-humidity sensor;
wherein causing the apparatus to identify or calculate the dew-point temperature includes causing the apparatus to calculate the dew-point temperature as a function of the ambient temperature and relative humidity within the compartment; and wherein causing the apparatus to calculate the surface temperature includes causing the apparatus to calculate the surface temperature as a function of a total air temperature exterior to the vehicle and a speed of the vehicle.

14. The computer-readable storage medium of claim 12, wherein causing the apparatus to receive at least one measurement from one or more first sensors includes causing the apparatus to receive at least one measurement from at least two first sensors; and wherein causing the apparatus to automatically activate the fog protection system includes causing the apparatus to automatically activate the fog protection system only in the event fog is detected or predicted from the measurement from a majority of the first sensors.

15. The computer-readable storage medium of claim 12, wherein causing the apparatus to automatically activate the fog protection system includes causing the apparatus to automatically activate the fog protection system in the event fog is predicted or detected according to the measurements from a majority of a collective of the one or more first sensors and the one or more second sensors.

* * * * *